Jan. 16, 1940.   J. H. WILCOX   2,187,438
SOY BEAN HARVESTER ATTACHMENT
Filed Nov. 23, 1938   2 Sheets-Sheet 1

Inventor
J. H. Wilcox
By Clarence A. O'Brien
and Hyman Berman
Attorneys

Jan. 16, 1940.  J. H. WILCOX  2,187,438
SOY BEAN HARVESTER ATTACHMENT
Filed Nov. 23, 1938  2 Sheets-Sheet 2

Inventor
J. H. Wilcox

By
Attorneys

Patented Jan. 16, 1940

2,187,438

UNITED STATES PATENT OFFICE 2,187,438

SOY BEAN HARVESTER ATTACHMENT

John H. Wilcox, Easton, Md.

Application November 23, 1938, Serial No. 242,073

1 Claim. (Cl. 56—313)

This invention relates to new and useful improvements in harvesters and more particularly to an attachment for soy bean harvesters. At present the mowers of soy bean harvesters are equipped in most cases with means for elevating the bean vines in advance of the mower so that the mower can efficiently cut the vines and whereby to prevent the vines from passing under the mower. However, the conventional type of vine elevating means is more or less inefficient for the reason that frequently the lifting means bites into the ground, as when the machine is travelling over unlevel ground and as a result the machine is jammed and this frequently incurs damage to the machine.

The principal object of the present invention is to provide a bean vine elevating means for the mowers of bean harvesters which will not only efficiently elevate the vines so that they can be cut, but which will be of such construction as to eliminate biting of the lifting device into the ground with the resulting labor and probable damage to the machine.

Other objects and advantages of the invention will become apparent to the reader of the following specification:

Figures 1, 6:
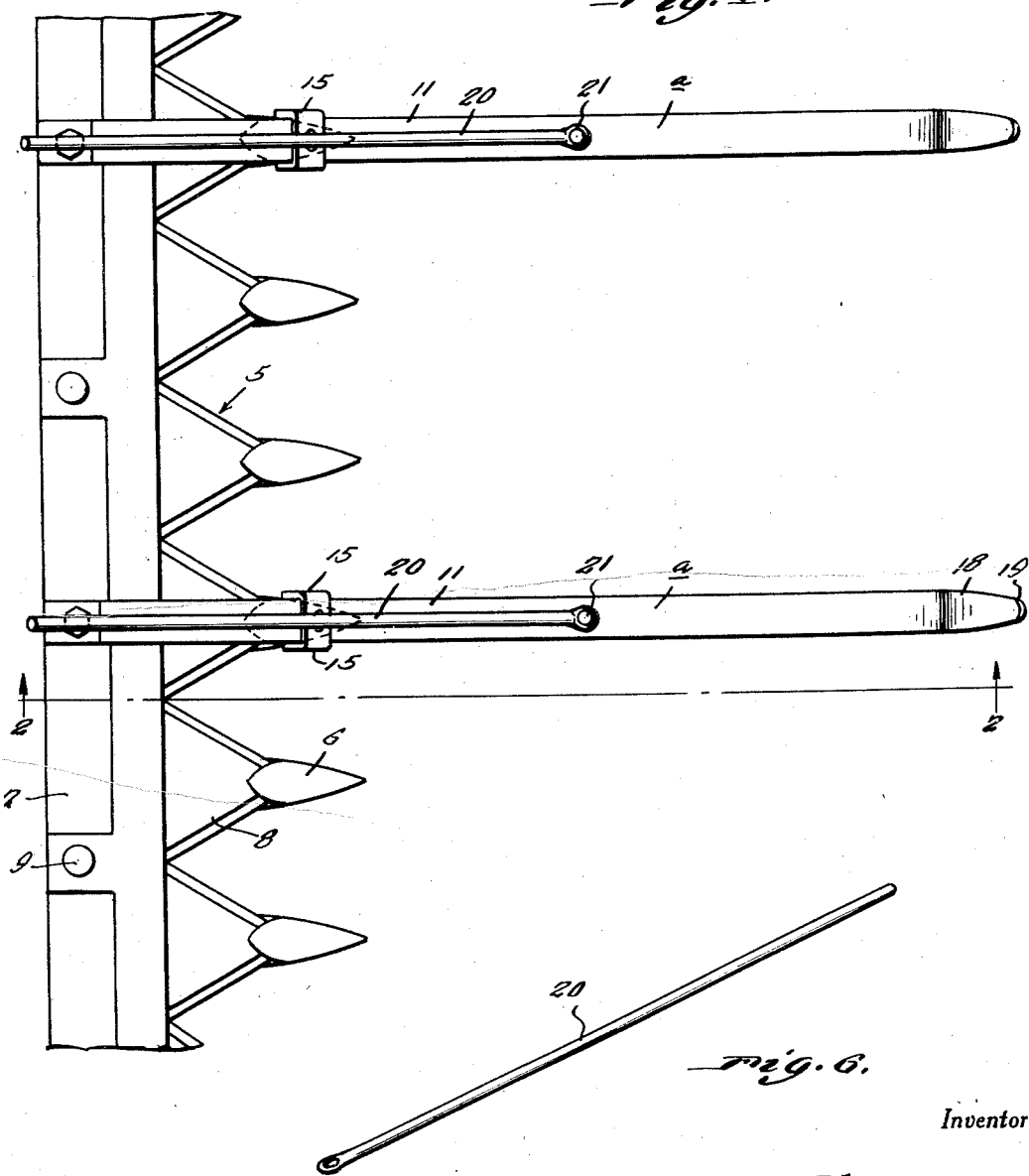
Figure 1 represents a fragmentary top plan view showing a mower equipped with a pair of the lifting devices.
Figure 6 is a perspective view of one of the lift fingers.
Figure 2:
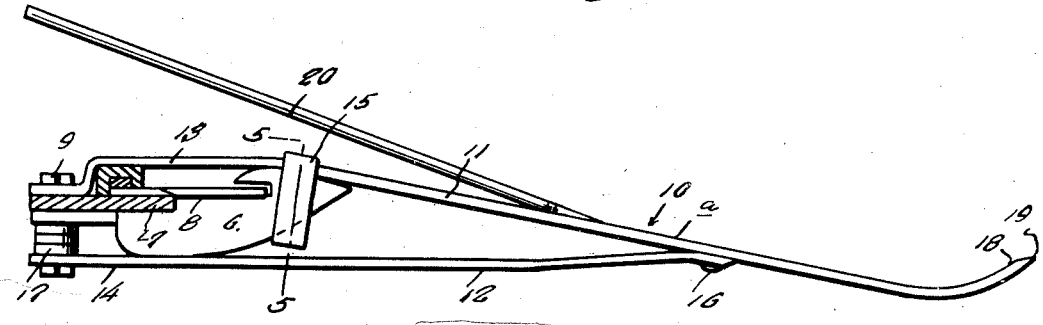
Figure 2 is a sectional view on line 2—2 of Figure 1.
Figure 3:
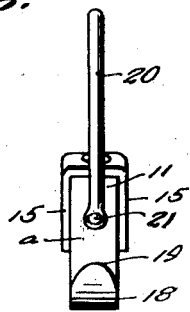
Figure 3 is a front elevational view of one of the devices.
Figure 4:
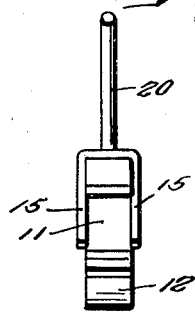
Figure 4 is a rear elevational view of one of the devices.
Figure 5:
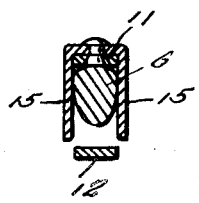
Figure 5 is a sectional view on line 5—5 of Figure 2.

Referring to the drawings wherein like numerals designate like parts, it can be seen in Figures 1 and 2, that numeral 5 generally refers to the usual mower assembly of a harvesting machine. As is well known, these mowers include guard teeth 6 at spaced intervals and these teeth extend forwardly from the board 7. Over the teeth 6 operates the usual mowing blade 8 of serrated construction.

Through the rear edge portion of the board 7 are disposed the usual retaining bolts 9 certain of which are used in conjunction with the mounting of the present invention which is generally referred to by numeral 10.

These devices 10 are used at about every third or fourth guard tooth 6, as is apparent in Figure 1. Each of these lifting devices consists of a pair of elongated preferably strap iron members 11 and 12, the elongated member 11 being substantially longer than the member 12. These members 11—12 have substantially parallel opposed portions 13 and 14 so as to straddle the guard tooth 6 and extending downwardly from opposite side edges of the upper elongated member 11 are the ears 15 which overlap the forward portion of the tooth 6 to prevent lateral displacement of the device 10 from the tooth. The forward end of the member 12 is riveted or otherwise secured as at 16 to a forward portion of the upper member 11. The rear ends of the upper and lower members 11 and 12 are apertured with the other upper member being offset downwardly for rest on the board 7. The aforementioned conventional bolt, with which to accommodate the present invention, is employed somewhat longer, is disposed through the apertured rear ends of the members 11 and 12 and it may be necessary to use some washers 17 above the lower member 12 to take up the space in accommodating the downward bulk of the tooth 6.

The forward portion of the upper member 11 extends well forwardly of the attaching point 16 and curves upwardly as at 18, the same preferably being bevelled at its forward extremity as at 19.

It can now be seen that the forward upwardly curved portion will ride on the ground, but will not bite into the ground, yet vines will be caught by this end of the elongated member 11 and will be required to ascend the inclined portion $a$ of the upper elongated member 11 until they reach the elongated finger 20. This finger 20 is preferably formed with an eye at its lower end and is riveted through this eye as at 21 to the upper elongated member 11 slightly rearwardly of the attaching point 16 of the lower member 12 with the said upper member 11.

Thus the vines will be well lifted so that the proper cutting action of the mower blade 8 will be obtained.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

A guard finger for mower guard teeth comprising a forwardly extending crop lifting structure consisting of an elongated member having its rear end attached to the mower structure and extending well forwardly of the mower guard teeth with its forward end curved upwardly, a second elongated member having its forward end secured to the intermediate portion of the first mentioned elongated member and extending rearwardly under the mower bar and connected to the under side thereof, a rearwardly extending lifting bar having its forward end secured to the intermediate portion of the upper elongated member and being straight and disposed backwardly in spaced relation above the mower bar, and depending ear members on the first mentioned elongated member adapted to straddle a corresponding mower guard tooth.

JOHN H. WILCOX.